United States Patent
Anghel et al.

(10) Patent No.: US 7,612,514 B2
(45) Date of Patent: Nov. 3, 2009

(54) ARCHITECTURE AND A MULTIPLE FUNCTION POWER CONVERTER FOR AIRCRAFT

(75) Inventors: Cristian E. Anghel, Oro Valley, AZ (US); Wayne T. Pearson, Oro Valley, AZ (US); Ray M. McGinley, Fountain Hills, AZ (US); Rocco DiVito, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 132 days.

(21) Appl. No.: 11/594,846

(22) Filed: Nov. 9, 2006

(65) Prior Publication Data

US 2008/0111420 A1    May 15, 2008

(51) Int. Cl.
 *B60L 1/00* (2006.01)
 *H02J 3/02* (2006.01)
(52) U.S. Cl. .................. 318/440; 363/34; 363/37
(58) Field of Classification Search ............ 363/34, 363/35, 37, 38; 318/440–442, 558
 See application file for complete search history.

(56) References Cited

U.S. PATENT DOCUMENTS

| | | | | |
|---|---|---|---|---|
| 3,902,073 | A * | 8/1975 | Lafuze | 290/46 |
| 4,587,436 | A * | 5/1986 | Cronin | 307/21 |
| 4,658,346 | A | 4/1987 | Templeton | |
| 4,670,832 | A | 6/1987 | Park | |
| 4,684,081 | A * | 8/1987 | Cronin | 244/58 |
| 4,786,852 | A * | 11/1988 | Cook | 322/10 |
| 4,935,859 | A * | 6/1990 | Kirchberg et al. | 363/39 |
| 4,937,462 | A * | 6/1990 | Recker et al. | 307/19 |
| 4,937,720 | A * | 6/1990 | Kirchberg | 363/41 |
| 4,947,100 | A * | 8/1990 | Dhyanchand et al. | 322/10 |
| 5,175,676 | A | 12/1992 | Kikuchi | |
| 5,181,159 | A | 1/1993 | Peterson et al. | |
| 5,181,169 | A | 1/1993 | Murugan | |
| 5,184,288 | A | 2/1993 | Washburn et al. | |
| 5,387,859 | A | 2/1995 | Murugan et al. | |
| 5,406,189 | A | 4/1995 | Wohlberg et al. | |
| 5,444,608 | A | 8/1995 | Jain et al. | |
| 5,694,307 | A | 12/1997 | Murugan | |
| 5,737,196 | A | 4/1998 | Hughes et al. | |
| 5,764,502 | A | 6/1998 | Morgan et al. | |
| 5,899,411 | A * | 5/1999 | Latos et al. | 244/53 A |
| 5,907,194 | A * | 5/1999 | Schenk et al. | 307/10.1 |
| 6,038,152 | A | 3/2000 | Baker | |
| 6,175,163 | B1 | 1/2001 | Rinaldi et al. | |
| 6,307,757 | B1 | 10/2001 | Porter et al. | |

(Continued)

*Primary Examiner*—Bentsu Ro
(74) *Attorney, Agent, or Firm*—Oral Caglar, Esq.

(57) ABSTRACT

A method and apparatuses are implemented for electric power systems. An apparatus for power conversion according to one embodiment comprises: a multiple function power converter (77), the multiple function power converter (77) being capable of performing functions of a static inverter, and being capable of at least one of performing functions of a motor controller, and performing functions of a start converter to use a generator as a starter. An architecture system for aircraft according to another embodiment comprises: one or more rectifiers (408), wherein the one or more rectifiers (408) receive at least one high frequency AC power input; and a plurality of power conversion devices (78) optionally connectable to drive at least one high frequency generator (105) as a starter and at least one load, the input of each power conversion device (78) being connected to at least one rectifier (408).

7 Claims, 10 Drawing Sheets

U.S. PATENT DOCUMENTS

| | | |
|---|---|---|
| 6,462,964 B2 | 10/2002 | Porter et al. |
| 6,583,992 B2 | 6/2003 | Porter et al. |
| 6,603,672 B1 | 8/2003 | Deng et al. |
| 6,664,656 B2 | 12/2003 | Bernier |
| 6,690,588 B2 | 2/2004 | York |
| 6,694,438 B1 | 2/2004 | Porter et al. |
| 6,791,848 B2 | 9/2004 | Porter et al. |
| 6,825,640 B1 | 11/2004 | Hill et al. |
| 6,850,426 B2 | 2/2005 | Kojori et al. |
| 6,856,045 B1 | 2/2005 | Beneditz et al. |
| 6,919,711 B2 | 7/2005 | Haydock et al. |
| 6,950,322 B2 | 9/2005 | Ferens |
| 6,961,251 B2 | 11/2005 | Porter et al. |
| 7,050,313 B2 | 5/2006 | Huang et al. |
| 7,064,526 B2 * | 6/2006 | Patterson ............... 322/46 |
| 2002/0109412 A1 * | 8/2002 | Johnson, Jr. ............ 307/66 |
| 2004/0129835 A1 | 7/2004 | Atkey et al. |
| 2004/0202012 A1 | 10/2004 | Ferens |

* cited by examiner

High Frequency Architecture With Centralized Rectifiers

FIG. 7

ARCHITECTURE AND A MULTIPLE FUNCTION POWER CONVERTER FOR AIRCRAFT

CROSS REFERENCE TO RELATED APPLICATION

This non-provisional application is related to co-pending non-provisional application titled "Modular and Scalable Power Conversion System for Aircraft" filed concurrently herewith, the entire contents of which are hereby incorporated by reference.

BACKGROUND OF THE INVENTION

1. Field of the Invention

The present invention relates to power conversion systems, and more particularly to an aircraft architecture and a multiple function power converter for an aircraft.

2. Description of the Related Art

Electric systems used in complex environments such as aerospace systems, more electric aircraft systems, industrial environments, vehicles, etc., include a large number of electric systems and modules. During operation of such complex environments, various electric systems and modules may need to be connected to electric power sources, disconnected from electric power sources, maintained in a powered-up state, etc., at various times. Moreover, various electric systems and modules in a complex environment may require different amounts and type of electrical power. For example, some electric systems and modules may require DC power while others may require AC power. Some electric systems and modules may require 28V dc, others 230V ac, yet others 115V ac at 400 Hz. The power levels required by various parts of a complex environment may also depend on the operational stage of the environment. For example, different levels of power may be needed during the start-up and during the continuous operation of a complex environment, such as an aircraft.

Aircraft are currently being designed to use less non-electric power (such as hydraulic and pneumatic power) and more electrical power. Aircraft system architectures that rely solely, or to a great extent, on electrical power, are also referred to as More Electric Aircraft (MEA) system architectures. Typically, MEA system architectures use starter generators to start the aircraft main engines as well as to supply electrical power to various system loads. These various system loads may utilize electrical power at various frequencies and voltages. Hence, many MEA system architectures, and/or starter generators currently used to power MEA system architectures, typically include relatively complex power electronics circuits with large weight. For example, some systems may include inverters, for converting DC to AC power, auto-transformer rectifier units (ATRUs) for converting AC power to DC power, and potentially complex voltage and frequency control circuits, which can increase overall complexity, cost, and maintenance.

An aircraft architecture that uses electric power for engine start and for other modules such as the Environmental Control System (ECS), requires a number of components to perform AC-DC and controlled DC-AC power conversion. These conversion components, together with their associated contactors, add significant weight and complexity to the aircraft. Components typically used to perform the AC-DC power conversion in complex systems such as aircraft systems are Transformer-Rectifiers Units (TRUs) or ATRUs. Both the TRUs and the ATRUs are large and bulky units.

One power system architecture for aircraft using ATRUs and TRUs is described in patent application US 2004/0129835 A1, by W. Atkey et al. In this patent application, an electric power distribution system includes AC generators. High voltage AC power can be converted to high voltage DC power by one or more AC-to-DC conversion devices, such as ATRUs, that receive AC power from AC busses. Using the ATRUs, the power distribution system provides high voltage AC and DC power to support conventional 115V and 28V dc bus architectures. During start, each AC generator is supplied by a dedicated start converter. During normal operation, each motor load, such as, for example, each air compressor motor, is supplied by a dedicated motor controller.

Complex electrical systems, such as variable frequency AC systems used in some MEA architectures, impose design constraints on the generating and conversion aircraft equipment, since the electromagnetic design of aircraft units that are part of the electrical power system, is heavily dependent upon the minimum frequency used. Some limited applications of high voltage DC distribution systems have attempted to relieve some of these design constraints. However, use of such high voltage DC distribution systems on large commercial aircraft has been hindered because of concerns over arc dissipation during faults, corona effect, and significant risks associated with the servicing of high power and high voltage DC systems.

Hence, the generating and conversion systems employed so far in the aerospace and related industries are sub-optimal, since the cost, weight, and reliability tradeoffs have not been favorable for many types and sizes of aircraft.

Disclosed embodiments of this application address these and other issues by utilizing a multiple function power converter in one embodiment, to perform multiple functions in the generating and conversion system of a large system such as an aircraft. The multiple function power converter performs the functions of a start converter, an ECS motor controller, a motor controller for other loads, and a static inverter to obtain a frequency that can be constant, hence eliminating dedicated converters, controllers and inverters. In another embodiment, an electric system architecture is implemented. The electric system architecture consists of a high voltage, high frequency generating and distribution system, resulting in lower size and weight. Frequency insensitive utilization equipment is directly connected to a high frequency bus. The majority of the utilization equipment is supplied through power conversion devices such as motor controllers, frequency converters, or transformer rectifiers. The high frequency output of the power generating system is rectified using AC/DC converters, such as rectifier bridges, located at the input of each of the power converters in the system. Centralized and distributed rectification architectures are presented in the current application. In a centralized rectification architecture, one rectifier is connected at the input of multiple power converters, while in a distributed rectification architecture, a different rectifier is connected at the input of each power converter. The centralized and distributed rectification architectures presented in the current application eliminate large ATRUs and TRUs from the aircraft generating and distribution system. Multiple function power converters may be used as controllers, converters and inverters in the electric system architecture, to realize more space and weight savings and increase efficiency of the generating and distribution system.

SUMMARY OF THE INVENTION

The present invention is directed to a method and apparatuses for electric power systems. According to a first aspect of the present invention, an apparatus for power conversion comprises: a multiple function power converter, the multiple function power converter being capable of performing functions of a static inverter, and being capable of at least one of performing functions of a motor controller, and performing functions of a start converter to use a generator as a starter.

According to a second aspect of the present invention, an architecture system for aircraft comprises: one or more rectifiers, wherein the one or more rectifiers receive at least one high frequency AC power input; and a plurality of power conversion devices optionally connectable to drive at least one high frequency generator as a starter and at least one load, the input of each power conversion device being connected to at least one rectifier.

According to a third aspect of the present invention, a method for power conversion comprises: receiving high frequency AC power; rectifying the high frequency AC power with one or more rectifiers; performing conversion of conditioned power obtained from the rectifying step; and driving at least one high frequency generator as a starter and at least one load with output power from the performing step.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
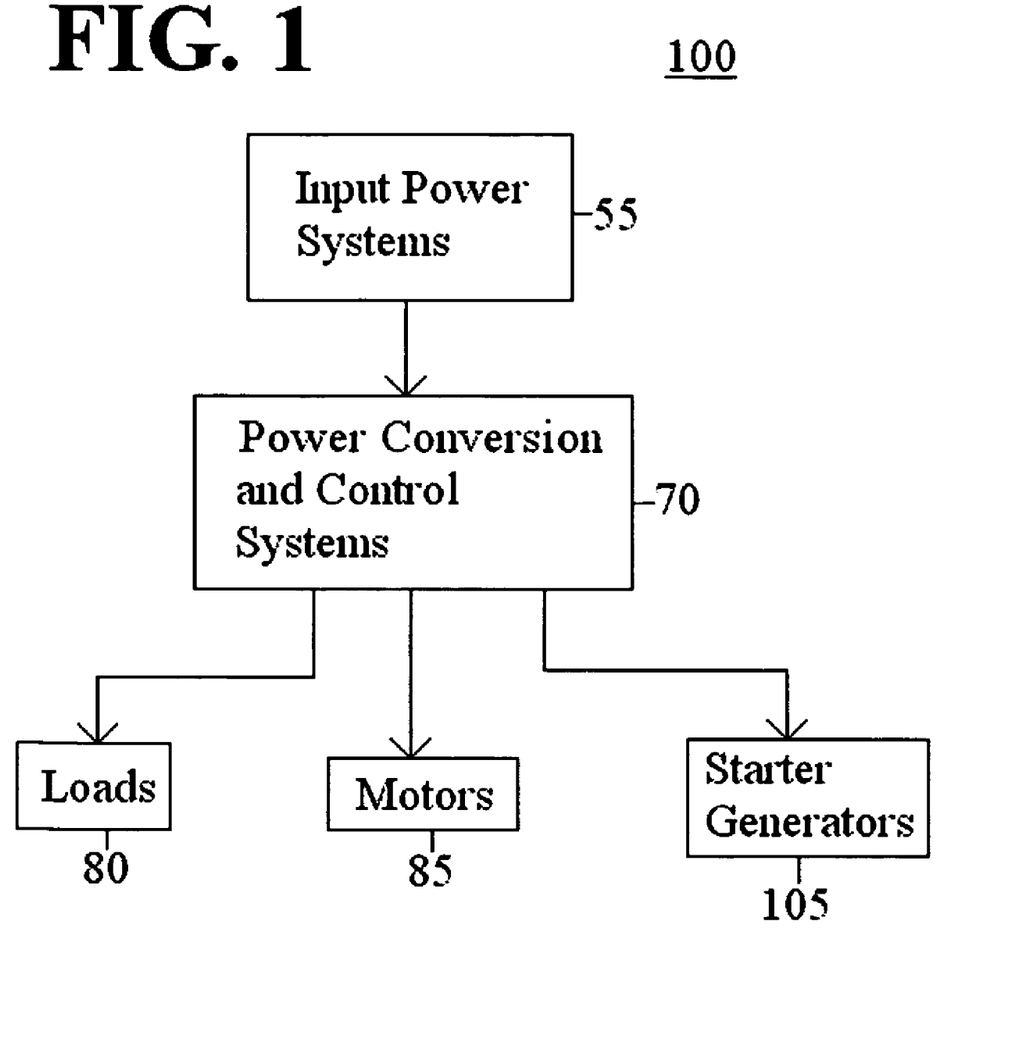
FIG. 1 is a general block diagram of an electrical system to which principles of the present invention can be applied according to an embodiment of the present invention.

Aspects of the invention are more specifically set forth in the accompanying description with reference to the appended figures. FIG. 1 is a general block diagram of an electrical system to which principles of the present invention can be applied according to an embodiment of the present invention. The electrical system 100 illustrated in FIG. 1 includes the following components: input power systems 55; power conversion and control systems 70; loads 80; motors 85; and starter generators 105. Operation of the electrical system 100 in FIG. 1 will become apparent from the following discussion.

Electrical system 100 may be associated with systems with electrical components, such as a cabin air compressor system, a hydraulic system, a heating system, a traction system, etc., in an aircraft, a ship, a train, a laboratory facility, etc. Input power systems 55 provide electrical power to loads 80, motors 85, and starter generators 105, through the power conversion and control systems 70. Input power systems 55 handle wattage power that can be on the order of W, kW, hundreds of kW, MW, etc., and voltages that can be on the order or Volts, hundreds to thousands of Volts, etc. The outputs of input power systems 55 may be DC voltages, AC voltages, etc. Input power systems 55 may include turbines, motors, generators, transformers, filters, circuit breakers, etc.

Power conversion and control systems 70 receive power from input power systems 55 and provide electrical power to loads 80, motors 85, and starter generators 105. Loads 80, motors 85, and starter generators 105 are systems that enable functioning of services onboard a vehicle, in an aircraft, in a lab, etc. Loads 80, motors 85, and starter generators 105 may include an air conditioning system, a navigation system, an aircraft control system, a cabin air compressor, a starter generator, a braking system, etc.

Input power systems 55 and power conversion and control systems 70 may provide, and loads 80, motors 85, and starter generators 105 may use, various AC or DC voltages. For example, some electrical systems may utilize AC voltages of 115V or 230V or higher, with fixed frequencies (such as, for example, 50/60 Hz or 400 Hz), or variable frequencies (such as, for example 360-800 Hz for aerospace applications, 1000-2000 Hz for high frequency), or DC voltages such as, for example, 28V, 270V, or ±270V.

Although the systems in electrical system 100 are shown as discrete units, it should be recognized that this illustration is for ease of explanation and that the associated functions of certain functional modules or systems can be performed by one or more physical elements.

Figure 2:
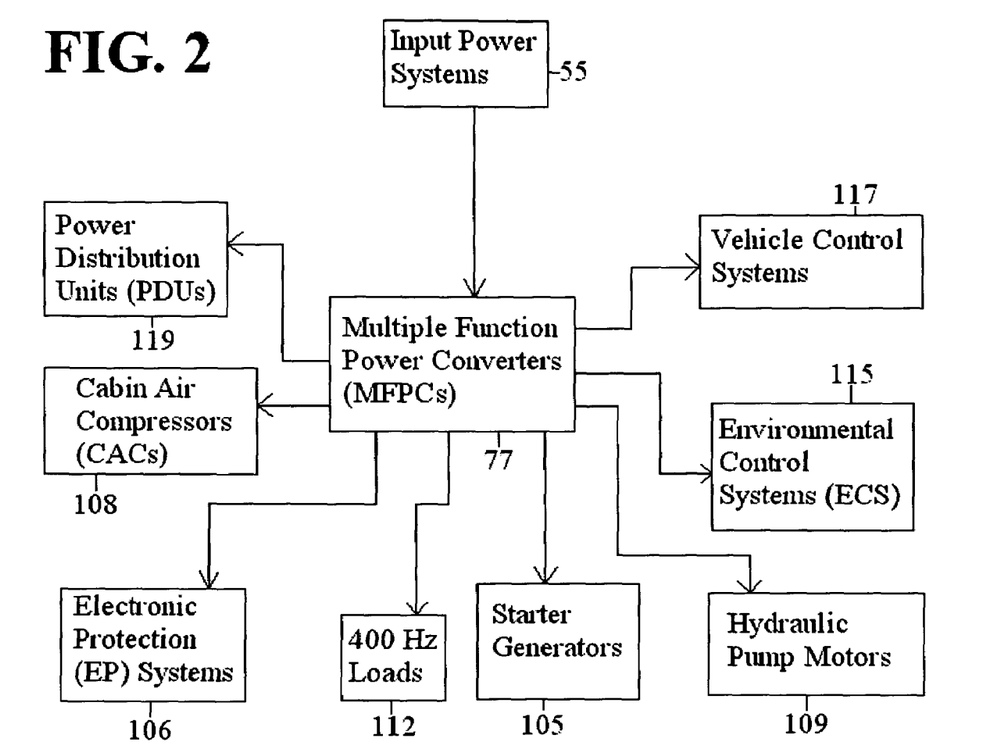
FIG. 2 is a block diagram of an electrical configuration containing multiple function power converters according to an embodiment of the present invention.

FIG. 2 is a block diagram of an electrical configuration containing multiple function power converters (MFPCs) 77 according to an embodiment of the present invention. MFPCs 77 are included in the power conversion and control system 70 illustrated in FIG. 1. As illustrated in FIG. 2, MFPCs 77 receive power from input power systems 55, and provide power to various load, motor, and starter generator systems, including, but not limited to: power distribution units (PDUs) 119; cabin air compressors (CAC) 108; electronic protection (EP) systems 106; 400 Hz (or other standard frequencies used in aircraft electrical systems) loads 112; starter generators 105; hydraulic pump motors 109; environmental control systems 115; vehicle control systems 117; etc. Further details on the MFPCs 77 can be found in FIG. 3B.

Figure 3A:
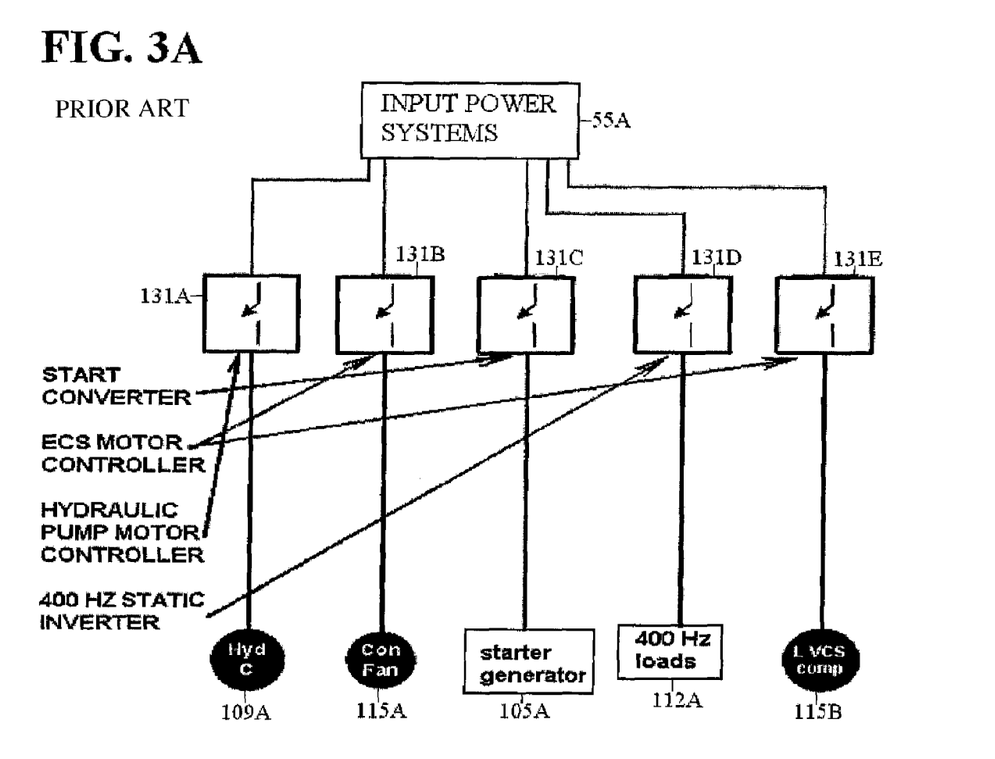
FIG. 3A is a block diagram illustrating a typical/conventional aircraft electrical system using multiple controllers, converters and inverters.

FIG. 3A is a block diagram illustrating a typical/conventional aircraft electrical system using multiple controllers, converters and inverters. As illustrated in FIG. 3A, hydraulic loads, 400 Hz loads, a starter generator, vapor cycle system (VCS) components inside ECS, and a condenser fan are powered using input power from input power systems 55A. Separate, dedicated motor controllers, converters and inverters need to be used, in a typical/conventional aircraft, to supply power to various loads. For example, a hydraulic pump motor controller 131A is used to provide power to the hydraulic loads 109A; ECS motor controllers 131B and 131E are used to provide power to a condenser fan 115A and to VCS components 1115B; a 400 Hz static inverter 131D is used to provide power to 400 Hz loads 112A; and a start converter 131C is used to provide power to a starter generator 105A.

The 400 Hz static inverter 131D used to provide power to 400 Hz loads 112A is a unit specifically designed for this function. Hence, the 400 Hz static inverter is not used in other functions.

As it can be seen in FIG. 3A, multiple units, including controllers, converters and inverters are used in typical/conventional aircraft systems to power various systems such as hydraulic loads, 400 Hz loads, starter generators, VCS components, fans, etc. Hence, dedicated motor controllers supply each of the various loads in a large system. In typical/conventional systems, multiple units such as multiple controllers, converters and inverters, lead to increase in weight, complexity, and size of the systems using them, such as aircraft systems. Also, reliability of a system using dedicated controllers, converters and inverters is decreased, because when a dedicated controller or converter fails, the associated load stops receiving power.

Figure 3B:
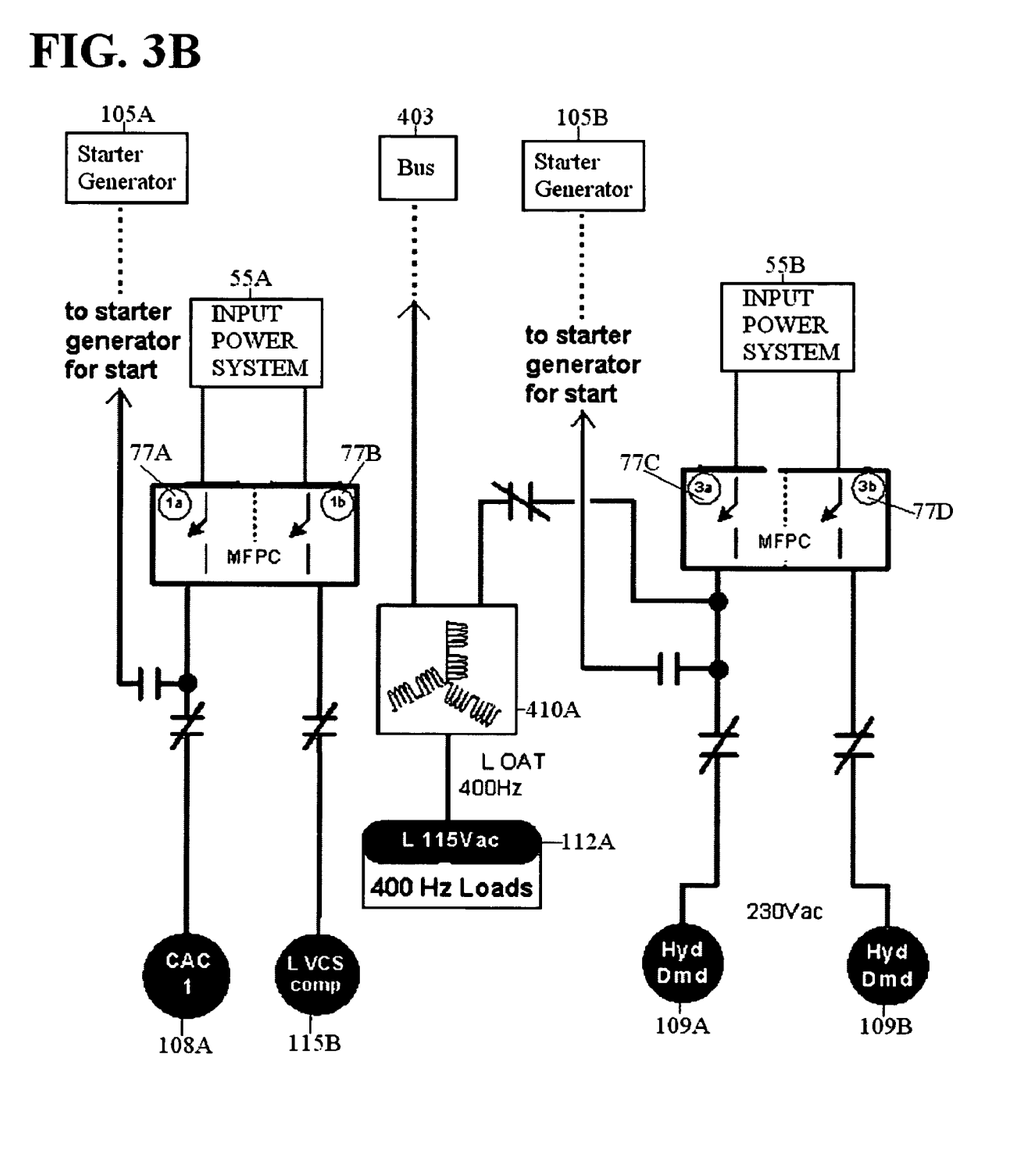
FIG. 3B is a block diagram of a system including multiple function power converters according to an embodiment of the present invention illustrated in FIG. 2.

FIG. 3B is a block diagram of a system including multiple function power converters (MFPCs) according to an embodiment of the present invention illustrated in FIG. 2. Four MFPC's are illustrated in FIG. 3B: MFPC 1a (77A), MFPC 1b (77B), MFPC 3a (77C), and MFPC 3b (77D). The MFPC 1a (77A) provides power to a starter generator 105A for start. After providing power to starter generator 105A, the MFPC 1a (77A) is operated to provide power to CAC 1 (108A). The MFPC 1b (77B) provides power to VCS components 115B. The MFPC 3a (77C) provides power to a starter generator 105B for start. The MFPC 3a (77C) is next operated to provide power to hydraulic load 109A. The MFPC 3b (77D) provides power to hydraulic load 109B. Hydraulic loads may include pumps, hydraulic motors, etc., which may be powered at a variety of voltages and powers, such as, for example, at 115V AC or 230V AC.

MFPC 3a (77C) may also provide power to 400 Hz loads 112A, where 400 Hz is one of the standard frequencies used in aircraft electrical systems. While 400 Hz loads are shown in FIG. 3B, loads using other frequencies can also receive conditioned power from MFPC 3a (77C). Such loads may use 115V AC, for example. An output autotransformer (OAT) 410A may be used to produce the 400 Hz frequency (or other standard frequency used in aircraft electrical systems) from the output waveforms coming from MFPC 3a (77C). The OAT 410A includes filters to obtain 400 Hz (or other standard frequency used in aircraft electrical systems) power from the MFPC 3a (77C) with the required power quality. Hence, the output of the MFPC 3a (77C) functioning as a motor controller corresponds to the input required by 400 Hz loads 112A. As mentioned above, the frequency of 400 Hz is not limitative of the present invention. MFPCs may provide power to loads using other constant or variable frequencies, such as loads associated with MEA aircraft.

The input power provided by input power systems 55A and 55B may be fixed or variable high frequency AC power, fixed or variable low frequency AC power, DC power, etc. Using high frequency AC power is advantageous, as it requires smaller starter generators, and therefore leads to reductions in size, weight, and complexity of the aircraft systems.

In one embodiment, the MFPCs may be bi-directional converters.

Each of the MFPCs 1a, 1b, 3a, 3b (77A, 77B, 77C, 77D) illustrated in FIG. 3B can therefore perform multiple functions. Each MFPC is a multipurpose controller, and can perform the functions of multiple converters and drive numerous loads. The MFPCs can also perform the functions of start converters to convert energy and power, 400 Hz (or other standard frequencies used in aircraft electrical systems) static inverters, ECS motor controllers, hydraulic pumps motor controllers, etc. Lighter and more efficient units can be built, due to shared MFPC hardware, as the same power pass in the converters performs different functions. Fewer MFPCs than the number of loads can be used, because each MFPC can supply a variety of loads at different times. An MFPC can also supply more than one load at the same time, as illustrated by MFPC 3a (77C), which supplies power to hydraulic load 109A and 400 Hz (or other standard frequencies used in aircraft electrical systems) loads 112A simultaneously. The dedicated 400 Hz static inverter from FIG. 3A is eliminated, as the MFPC also performs the functions of a 400 Hz static inverter.

In one embodiment, MFPCs may incorporate rectification functions, to eliminate the need for TRUs and ATRUs in electrical conversion systems. To incorporate rectification functions, MFPCs may include rectification devices such as diodes. Rectifiers may alternatively be used together with the MFPCs, to receive high frequency input power as further described in FIG. 7.

Hence, the MFPCs perform the following functions: AC/DC conversion; electric engine start; driving the ECS or cabin air compressors; function of static inverters to provide, for example, 115V AC or 230V AC, 3-phase, 400 Hz (or other standard frequencies used in aircraft electrical systems) electrical power for aircraft systems and equipment that require such power. Aircraft wiring savings are achieved by using the generator main feeders during engine start, thus eliminating the need for dedicated feeders for start. Aircraft system weight and volume are optimized/reduced using the MFPCs, due to the following effects: MFPCs can be designed for relaxed input power quality requirements, to reduce bulky, electromagnetic interference (EMI) filters; the operating frequency of system machines, such as permanent magnet (PM) motors and starter generators (SG) are better matched, thereby optimizing MFPC controls; a private bus architecture implemented with the MFPCs eliminates the need for neutral contactors on each starter generator, because neutral reference points can be incorporated into the MFPCs; the private bus architecture can use existing feeders to perform main engine starts, thereby eliminating the need for dedicated Main Engine Start (MES) wiring. Weight and volume system savings are hence achieved.

Figure 4:
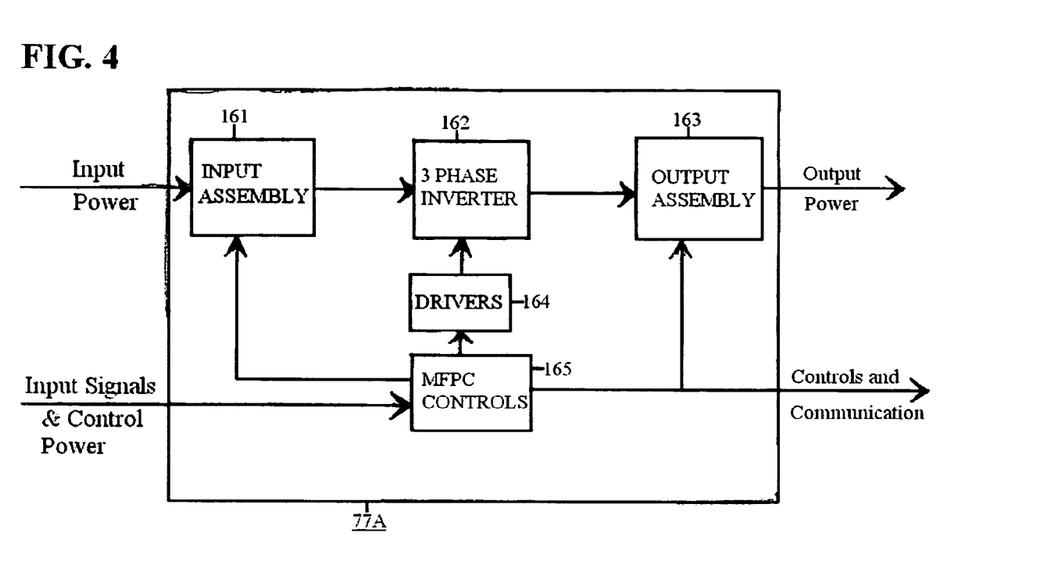
FIG. 4 is a block diagram illustrating an exemplary implementation for a multiple function power converter according to an embodiment of the present invention illustrated in FIG. 2.

FIG. 4 is a block diagram illustrating an exemplary implementation for a multiple function power converter according to an embodiment of the present invention illustrated in FIG. 2. As illustrated in FIG. 4, an MFPC 77A includes: an input assembly 161; a 3 phase inverter 162; an output assembly 163; drivers 164; and MFPC controls 165. Input power passes through the input assembly 161, the 3 phase inverter 162, and the output assembly 163, from which output power is obtained to power loads connected to the MFPC 77A. Input signals and control power are received at MFPC controls 165, and a controls and communication output is obtained. MFPC controls 165 control the input assembly 161 and the output assembly 163. MFPC controls 165 also control the 3 phase inverter 162 via the drivers 164.

The input assembly 161 includes input filters, DC Link filters, and isolation devices. The output assembly 163 includes output filters and isolation devices. The isolation devices may be, for example, contactors or relays.

MFPC controls 165 include multiple control loops that can operate separately and independently of each other. Using one control loop, the MFPC controls 165 control the MFPC 77A to drive a generator as a starter. Subsequently, the MFPC controls 165 use a second control loop to control the MFPC 77A to operate as a motor controller and supply motor loads, and/or a third control loop to control the MFPC 77A to operate as a static inverter and supply 400 Hz (or other standard frequencies used in aircraft electrical systems) to loads needing such frequency.

Figure 5:
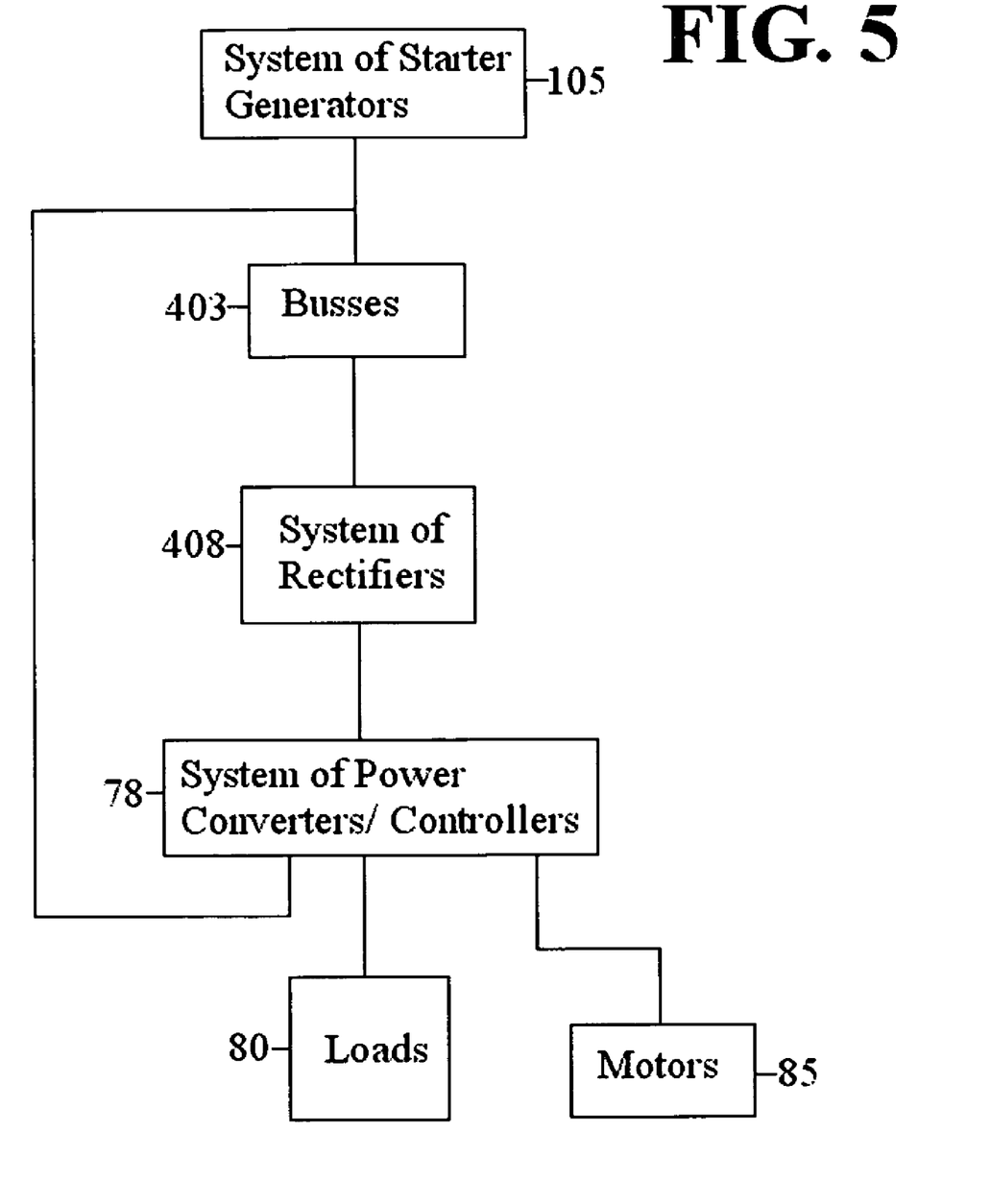
FIG. 5 is a block diagram of an electric system high frequency architecture containing rectifiers and power conversion devices according to a second embodiment of the present invention.

FIG. 5 is a block diagram of an electric system high frequency architecture containing rectifiers and power conversion devices according to a second embodiment of the present invention. The electric system architecture illustrated in FIG. 5 implements a high voltage, high frequency generating and distribution system. The generating and distribution system may be one phase, three phase, etc. The majority of the utilization equipment, such as loads and motors, are supplied through power conversion devices such as motor controllers, frequency converters, or transformer rectifiers. The power conversion devices perform power functions to start main engines and provide power to ECS, hydraulic loads, etc.

Modern airplane generating and distribution systems need to supply electric power for a large number of complex functions. To supply additional electric power required for new and complex functions, some airplane generating and distribution systems use variable frequency or high voltage DC electric systems. Existing more electric aircraft architectures, for example, typically use variable frequency AC systems, generally described in industry standards over the range of 360 to 800 Hz. This standard accommodates the typical variation in main engine driven generator frequency, and allows the same aircraft bus to operate with a fixed frequency generator, such as typically supplied by an auxiliary power unit. However, typical/conventional power distribution systems impose design constraints on the generating and conversion equipment, since the electromagnetic design of aircraft units that are part of the electrical power system, is heavily dependent upon the minimum frequency.

A high frequency electrical configuration illustrated in FIG. 5 addresses these and other issues. The high frequency electrical configuration illustrated in FIG. 5 comprises: a system of starter generators 105; busses 403; a system of rectifiers 408; a system of power converters and controllers 78; loads 80; and motors 85. The system of power converters and controllers 78 receives high frequency power and provide power to loads 80, motors 85, and system of starter generators 105. The system of power converters and controllers 78, the system of rectifiers 408, and busses 403 are included in power conversion and control systems 70 illustrated in FIG. 1.

The system of power converters and controllers 78 may include independent motor controllers, multifunctional motor controllers such as MFPCs illustrated in FIG. 3B, etc. The busses 403 include one or more busses, such as, for example, 2 main busses and an auxiliary power unit (APU) bus. The system of starter generators 105 include one or more high frequency starter generators. The system of rectifiers 408 may be centralized or distributed. In a centralized system of rectifiers 408, one rectifier supplies multiple motor controllers 78 on one side of the system. In a distributed system of rectifiers 408, rectifiers may be placed at the output of each generator, so that one rectifier supplies each motor controller 78. When the system of rectifiers 408 is distributed, smaller rectifiers may be used in association with each motor controller 78.

The architecture illustrated in FIG. 5 allows the use of multiple converters/inverters that can: supply 400 Hz (or other standard frequencies used in aircraft electrical systems) to loads needing such frequency; perform engine start; control motors for the ECS, hydraulic pumps, flight controls; etc. ATRUs can be eliminated because the architecture in FIG. 5 associates rectifiers with motor controllers, and performs the functions of an ATRU using appropriate high frequency generators in conjunction with the rectifiers.

The high frequency output of the power generating system is rectified by using AC/DC converters 408, which may be, for example, rectifier bridges, located at the input of each of the power converters 78 of the electric system. By employing high-frequency input busses 403, the filters used to reduce the DC ripple are optimized with respect to weight, volume and cost.

In the architecture illustrated in FIG. 5, the generation and distribution systems may be notionally specified over a certain frequency range, such as, for example, the range of 1000 to 2000 Hz. In one embodiment, only frequency insensitive utilization equipment is directly connected to the busses 403.

An important advantage of the system architecture illustrated in FIG. 5 is that the generating and power conversion equipment is designed for higher frequency, resulting in lower size and weight. Another advantage of the system architecture illustrated in FIG. 5 is that a centralized or distributed rectification approach eliminates large auto-transformer rectifier units typically used in previous systems to condition the power at the bulk power level.

Figure 6A:
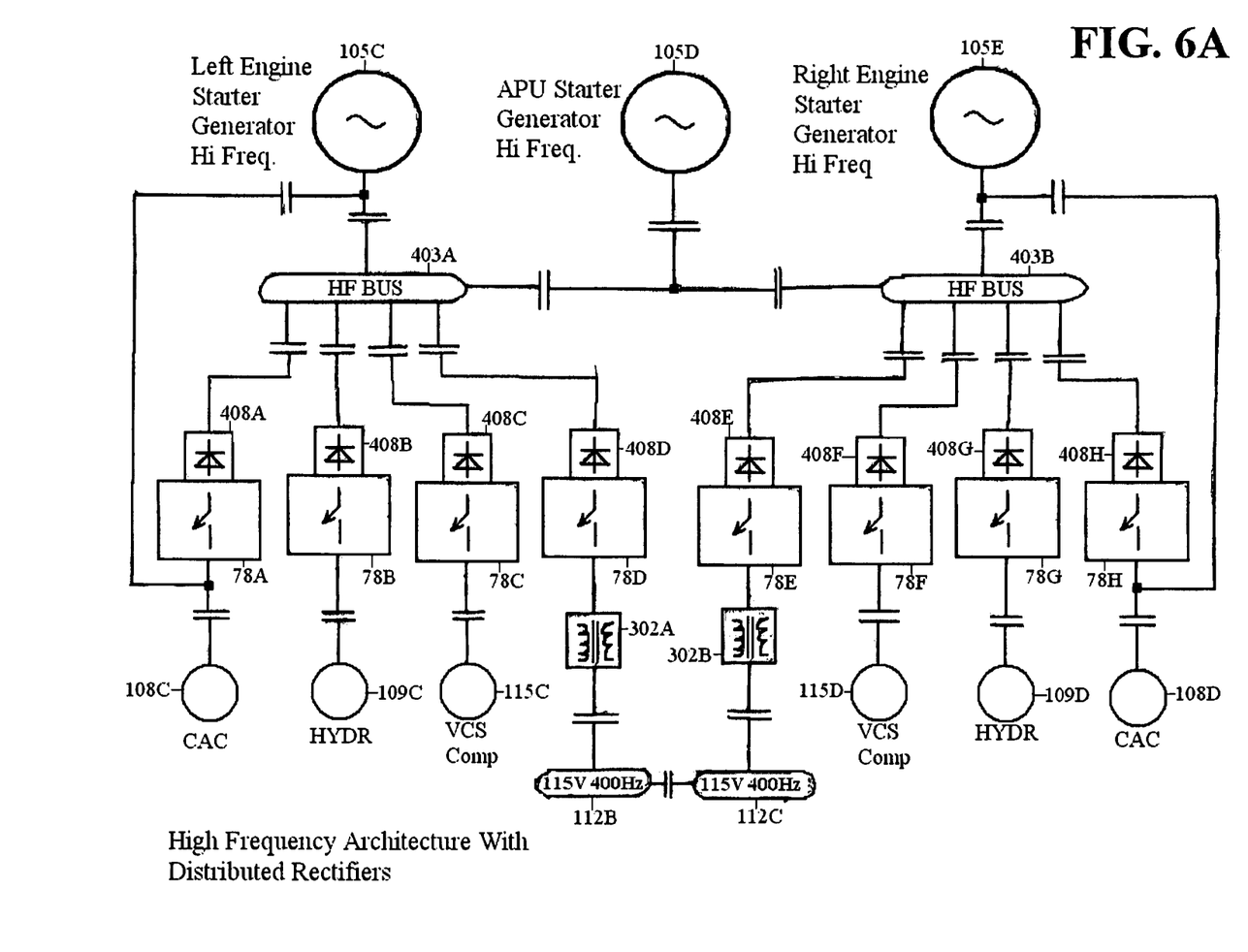
FIG. 6A is a block diagram of a high frequency architecture with distributed rectifiers according to a second embodiment of the present invention illustrated in FIG. 5.

FIG. 6A is a block diagram of a high frequency architecture with distributed rectifiers according to a second embodiment of the present invention illustrated in FIG. 5. As illustrated in FIG. 6A, a high frequency left engine starter generator 105C, a high frequency APU starter generator 105D, and a high frequency right engine starter generator 105E are connected to high frequency (HF) busses 403A and 403B. Power converter systems 78A, 78B, 78C, 78D, 78E, 78F, 78G, and 78H convert power received from HF busses 403A and 403B via rectifiers, and provide power to a CAC 108C, a hydraulic load 109C, a VCS component 115C, a CAC 108D, a hydraulic load 109D, a VCS component 115D, high frequency left engine starter generator 105C, high frequency right engine starter generator 105E, and 400 Hz (or other standard frequencies used in aircraft electrical systems) loads 112B and 112C through transformers 302A and 302B.

Individual rectifiers are associated with each power converter system, so that the power converter systems 78A, 78B, 78C, 78D, 78E, 78F, 78G, and 78H provide conditioned power to the loads. As illustrated in FIG. 6A, rectifier 408A is associated with power converter system 78A, rectifier 408B is associated with power converter system 78B, rectifier 408C is associated with power converter system 78C, and so on. The rectifiers 408A, 408B, 408C, 408D, 408E, 408F, 408G, 408H may include rectification devices such as diodes, thyristors, etc., to perform waveform rectification. Although 8 power converter systems and associated rectifiers are shown in FIG.

6A, the high frequency architecture with distributed rectifiers can include more or less than 8 power converter systems and associated rectifiers.

Figure 6B:
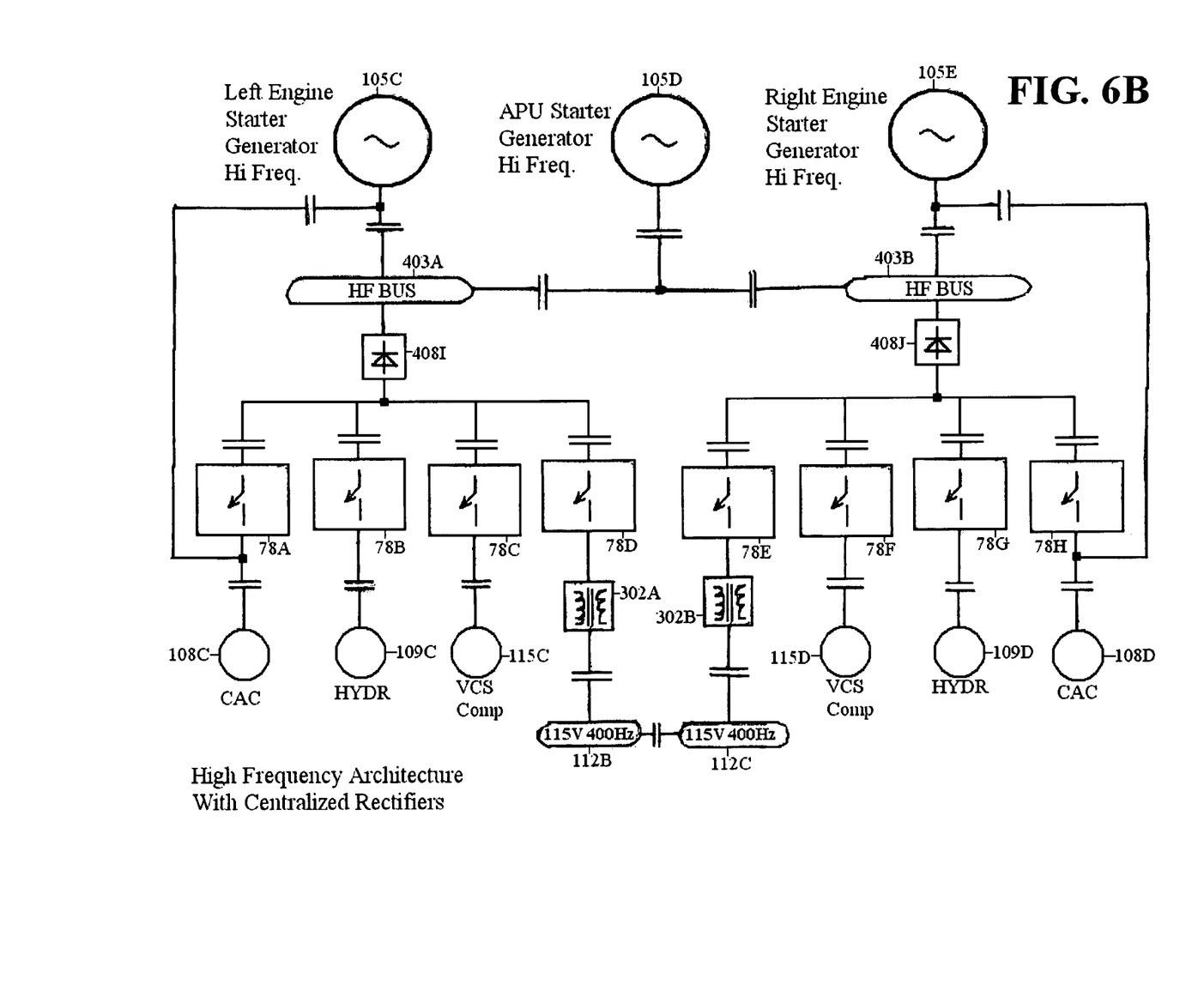
FIG. 6B is a block diagram of a high frequency architecture with centralized rectifiers according to a second embodiment of the present invention illustrated in FIG. 5.

FIG. 6B is a block diagram of a high frequency architecture with centralized rectifiers according to a second embodiment of the present invention illustrated in FIG. 5. As illustrated in FIG. 6B, high frequency left engine starter generator 105C, high frequency APU starter generator 105D, and high frequency right engine starter generator 105E are connected to high frequency (HF) busses 403A and 403B. Power converter systems 78A, 78B, 78C, 78D, 78E, 78F, 78G, and 78H convert power received from HF busses 403A and 403B via the rectifiers 408I and 408J, and provide power for a CAC 108C, a hydraulic load 109C, a VCS component 115C, a CAC 108D, a hydraulic load 109D, a VCS component 115D, high frequency left engine starter generator 105C, high frequency right engine starter generator 105E, and 400 Hz (or other standard frequencies used in aircraft electrical systems) loads 112B and 112C through transformers 302A and 302B. Centralized rectifiers are associated each HF bus and with groups of power converter systems, so that the power converter systems 78A, 78B, 78C, 78D, 78E, 78F, 78G, and 78H provide conditioned power to the loads. As illustrated in FIG. 6B, rectifier 408I is associated with power converter systems 78A, 78B, 78C, and 78D, and rectifier 408J is associated with power converter systems 78E, 78F, 78G, and 78H. The rectifiers 408I and 408J may include rectification devices such as diodes, thyristors, etc., to perform waveform rectification. Although 8 power converter systems and two centralized rectifiers are shown in FIG. 6B, the high frequency architecture with centralized rectifiers can include more or less than 8 power converter systems grouped in groups of variable size, with associated centralized rectifiers.

Figure 6C:
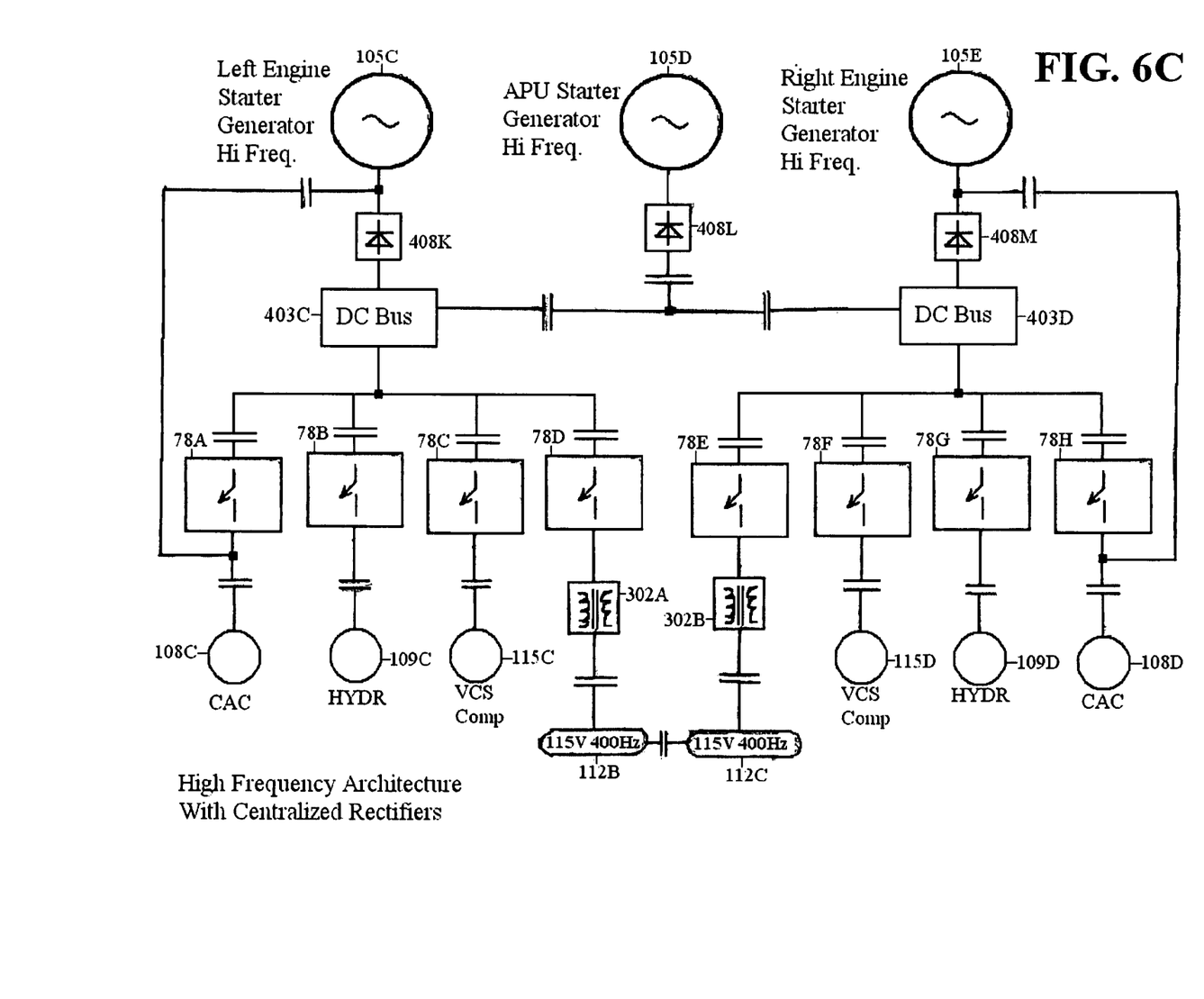
FIG. 6C is a block diagram of another high frequency architecture with centralized rectifiers according to a second embodiment of the present invention illustrated in FIG. 5.

FIG. 6C is a block diagram of another high frequency architecture with centralized rectifiers according to a second embodiment of the present invention illustrated in FIG. 5. FIG. 6C illustrates another embodiment for a high frequency architecture with centralized rectifiers. As illustrated in FIG. 6C, high frequency left engine starter generator 105C, high frequency APU starter generator 105D, and high frequency right engine starter generator 105E are connected to rectifiers 408K, 408L, and 408M. Centralized rectifiers 408K and 408L are connected to DC bus 403C, which is connected to power converter systems 78A, 78B, 78C, and 78D. Centralized rectifiers 408L and 408M are connected to DC bus 403D, which is connected to power converter systems 78E, 78F, 78G, and 78H. Power converter systems 78A, 78B, 78C, 78D, 78E, 78F, 78G, and 78H provide conditioned power for a CAC 108C, a hydraulic load 109C, a VCS component 115C, a CAC 108D, a hydraulic load 109D, a VCS component 115D, high frequency left engine starter generator 105C, high frequency right engine starter generator 105E, and 400 Hz (or other standard frequencies used in aircraft electrical systems) loads 112B and 112C through transformers 302A and 302B. The rectifiers 408K, 408L, and 408M may include rectification devices such as diodes, thyristors, etc., to perform waveform rectification. Although 8 power converter systems and three centralized rectifiers are shown in FIG. 6C, the high frequency architecture with centralized rectifiers in FIG. 6C can include more or less than 8 power converter systems grouped in groups of variable size, with more than two or less than two associated centralized rectifiers per group.

The high frequency architectures with distributed or centralized rectifiers illustrated in FIGS. 5A, 5B, and 5C eliminate the heavy and bulky TRUs or ATRUs, by using private high-voltage and high-frequency AC buses and incorporating the AC/DC function with the power converters, using rectifying elements. The high-voltage and high-frequency AC buses may be, for example, busses with 200/348V AC or 230/400V at 800 to 1,600 Hz. The power converters, together with the associated rectifiers, perform the following functions: AC/DC conversion; electric engine start; driving the ECS or cabin air compressors; function of static inverters to provide, for example, 115V AC or 230V AC, 3-phase, 400 Hz (or other standard frequencies used in aircraft electrical systems) electrical power for aircraft systems and equipment that require such power. The high frequency architectures with distributed or centralized rectifiers convert only the required amount of power from the starter generators to 400 Hz (or other standard frequencies used in aircraft electrical systems), and minimize the number of conversion steps. Additional aircraft system weight savings are realized in the systems illustrated in FIGS. 5A, 5B, and 5C, by using high frequency generators, which are smaller and lighter than the lower frequency counterparts. Aircraft wiring saving is achieved by using the generator main feeders during engine start, thus eliminating the need for dedicated feeders for start.

Aircraft system weight and volume are optimized/reduced using private buses, due to the following effects: high-frequency input (private bus) reduces size of DC link filters such DC bulk capacitance filters and thereby power converter weight and size; the frequency needed for aircraft loads, such as, for example, 400 Hz (or other standard frequencies used in aircraft electrical systems), can be efficiently obtained using the private high frequency bus, rectifiers, and output autotransformers (OATs) connected to power converter systems; the private bus can take advantage of relaxed input power quality requirements, thereby reducing bulky, electromagnetic interference (EMI) filters in the power converters; since the rectifiers are either part of the power converters or in proximity to the power converters, the power converters' existing cooling loops can be used for rectifiers, so that an optimized cooling system is realized by eliminating dedicated cooling loops for rectifiers; the operating frequency of system machines, such as permanent magnet (PM) motors and starter generators (SG) are better matched, thereby optimizing power converter controls; the private bus architecture eliminates the need for a dedicated AC power distribution panel; the private bus architecture eliminates the need for neutral contactors on each starter generator, because neutral reference points can be incorporated into the power converters; the private bus architecture can use existing feeders to perform main engine starts, thereby eliminating the need for dedicated Main Engine Start (MES) wiring. Additional weight savings may be achieved by customizing busses. For example, additional weight savings are achieved using a 6 phase private high-voltage and high-frequency AC bus, such as, for example, a 200/348V AC or 230/400V bus at 800 to 1,600 Hz, instead of a 3 phase bus.

Figure 7:
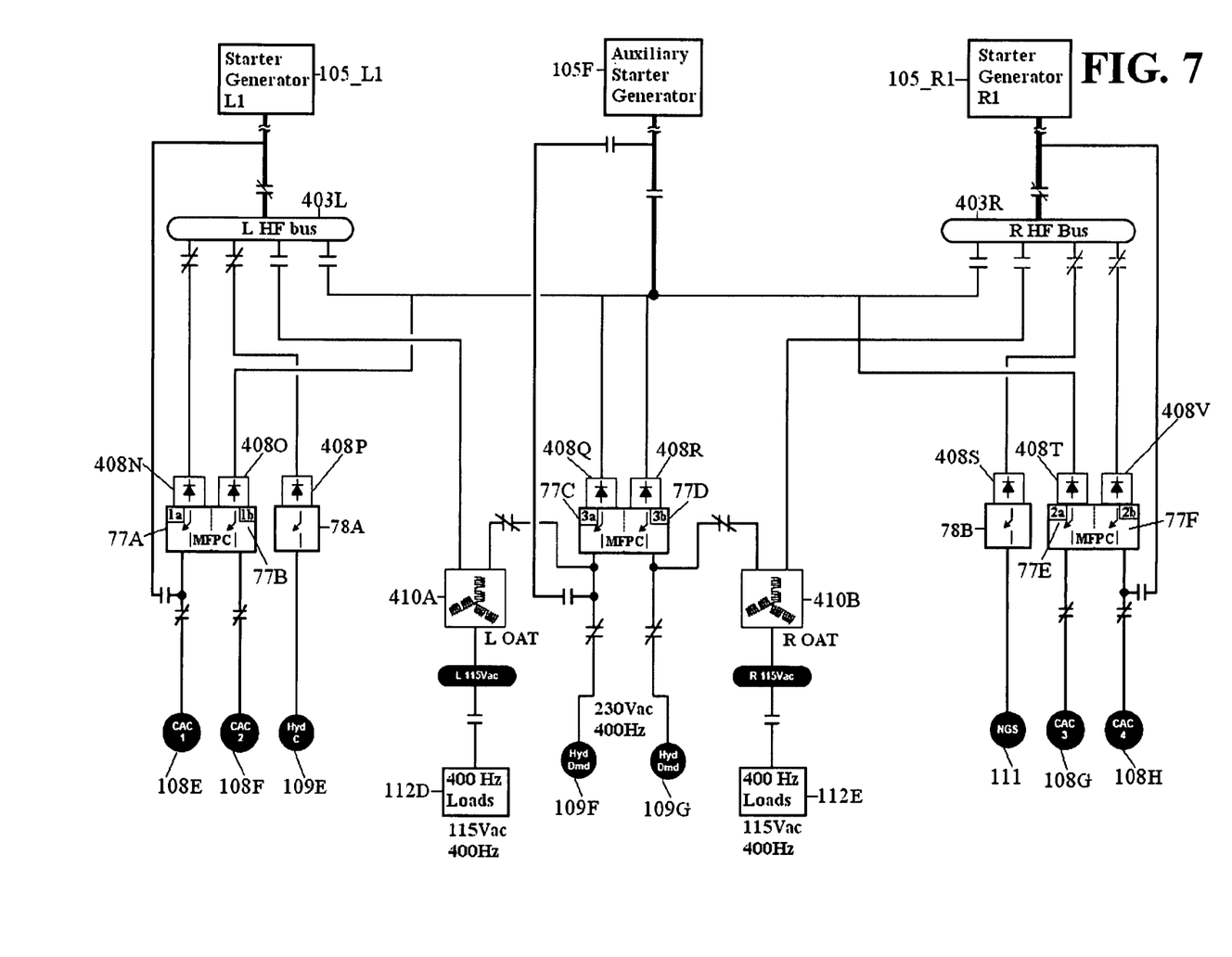
FIG. 7 is a block diagram of a high frequency architecture with distributed rectifiers and multiple function power converters according to a third embodiment of the present invention.

FIG. 7 is a block diagram of a high frequency architecture with distributed rectifiers and multiple function power converters according to a third embodiment of the present invention. FIG. 7 combines the distributed rectifier architecture of FIG. 6A, with the use of multiple function power converters described in FIG. 3B.

As illustrated in FIG. 7, a left engine starter generator 105_L1, an auxiliary starter generator 105F, and a right engine starter generator 105_R1 are connected to busses 403L and 403R. Multiple power converter units convert power received from busses 403L and 403R, and provide power for loads.

The power converter systems include MFPCs 1a and 1b (77A and 77B), 3a and 3b (77C and 77D), and 2a and 2b (77E and 77F), and power converter systems 78A and 78B. The MFPC 1a (77A) performs start of the left engine with starter generator 105_L1, and subsequently provides power for CAC 108E. The MFPC 1b (77B) provides power for CAC 108F. The MFPC 2a (77E) provides power for CAC 108G. The MFPC 2b (77F) performs start of right engine with starter generator 105_R1, and subsequently provides power for CAC 108H. The MFPC 3a (77C) is connected to auxiliary starter generator 105F, and provides power for hydraulic load 109F and 400 Hz loads 112D through left autotransformer (OAT) 410A. The MFPC 3b (77D) provides power for hydraulic load 109G and 400 Hz loads 112E through right autotransformer (OAT) 410B. Power converter systems 78A and 78B provide power for hydraulic load 109E and nitrogen generating system (NGS) 111 used for fuel tank inerting.

Individual rectifiers are associated with each power converter unit, so that the power converter units 77A, 77B, 77C, 77D, 77E, 77F, 78A, and 78B provide conditioned power to the loads. As illustrated in FIG. 7, rectifier 408N is associated with MFPC 1a (77A), rectifier 408O is associated with MFPC 1b (77B), rectifier 408Q is associated with MFPC 3a (77C), rectifier 408R is associated with MFPC 3b (77D), rectifier 408T is associated with MFPC 2a (77E), rectifier 408V is associated with MFPC 2b (77F), rectifier 408P is associated with power converter system 78A, and rectifier 408S is associated with power converter system 78B.

The rectifiers 408N, 408O, 408P, 408Q, 408R, 408S, 408T, 408V may include rectification devices such as diodes, thyristors, etc., to perform wave rectification. Although 6 MFPCs and 2 power converter systems are shown in FIG. 7, the high frequency architecture with distributed rectifiers can include more or fewer MFPCs, power converter systems, and associated rectifiers.

The left engine starter generator 105_L1, auxiliary starter generator 105F, and right engine starter generator 105_R1 may be high frequency generators, such as, for example, 1000-2000 Hz generators. Busses 403L and 403R may be high frequency input busses.

High frequency architectures with centralized rectifiers as illustrated in FIGS. 5B and 5C can also be combined with multiple function power converters illustrated in FIG. 3B.

The high frequency architectures with distributed or centralized rectifiers and using multiple function power converters provide multiple advantages to an electrical system. The high frequency architectures with distributed or centralized rectifiers and MFPCs eliminate the TRUs or ATRUs by using private high-voltage and high-frequency AC buses and incorporating the AC/DC function with or into the MFPC using rectifying elements. Hence, the effect of ATRUs, which produce multiple phase high frequency waveforms and rectify them, is achieved by using high frequency generators and rectifiers.

The high-voltage and high-frequency AC buses may be, for example, busses with 200/348V AC or 230/400V at 800 to 1,600 Hz. Aircraft system weight savings are realized in the system by using high frequency generators for starter generators 105_L1, 105_R1, and 105F. Since MFPCs can perform the functions of motor controllers, start converters, and inverters, a reduced number of MFPCs is sufficient to power a variety of different loads.

In one embodiment, the high frequency generators are wound field generators. In another embodiment, the high frequency generators are PM generators.

Embodiments of the current invention are not limited to the particular numbers of starter generators, or the particular number and types of loads illustrated, and can be used with any quantities and types of starter generators and loads.

Although some aspects of the present invention have been described in the context of aerospace applications, the principles of the present invention are applicable to any environments that use electrical power, such as industrial environments, vehicles, ships, etc., to provide various amounts of power, at various frequencies.

We claim:

1. An architecture system for power generation and distribution for aircraft, said architecture system comprising:
    at least one starter-generator operable at a high frequency;
    a plurality of alternating-current (AC) loads operable at frequencies lower than the high frequency;
    a plurality of multiple function power conversion devices at least one of which is bi-directional and is connectable to drive at least one starter-generator at the high frequency;
    wherein each of the plurality of multiple function power conversion devices is connectable to any of the AC loads;
    wherein an input of each power conversion device is connected to receive at least one AC power input at the high frequency from the at least one starter-generator;
    wherein at least one of the multiple function power conversion devices can perform the functions of a static inverter and a motor controller;
    wherein at least one of the multiple function power conversion devices can drive numerous types of AC loads at frequencies lower than the high frequency; and
    wherein a fewer number of multiple function power conversion devices are present than the number of loads.

2. The system according to claim 1, wherein
    the power conversion device contains a plurality of rectifiers.

3. The system according to claim 2, wherein
    one rectifier from said plurality of rectifiers is connected to at least two power conversion devices from said plurality of power conversion devices, and to a bus from a plurality of high frequency buses, to obtain a centralized architecture.

4. The system according to claim 2, wherein
    one rectifier from said plurality of rectifiers is connected to at least two power conversion devices from said plurality of power conversion devices, and to a high frequency generator, to obtain a centralized architecture.

5. The systems according to claim 1, wherein the plurality of power conversion devices include filters, used to reduce DC ripple, and are optimized with respect to at least one of weight and volume.

6. The system according to claim 1, wherein the plurality of power conversion devices include electromagnetic interference filters and DC link filters having a reduced size.

7. The system according to claim 1, wherein the plurality of power conversion devices include cooling loops.

* * * * *